United States Patent [19]

Althaus et al.

[11] Patent Number: 5,454,220

[45] Date of Patent: Oct. 3, 1995

[54] METHOD OF OPERATING GAS TURBINE GROUP WITH REHEAT COMBUSTOR

[75] Inventors: Rolf Althaus, Flawil; Franz Farkas, Zürich, both of Switzerland; Peter Graf, Waldshut-Tiengen, Germany; Fredy Häusermann, Rieden bei Nussbaumen; Erhard Kreis, Otelfingen, both of Switzerland

[73] Assignee: ABB Management AG, Baden, Switzerland

[21] Appl. No.: 212,850

[22] Filed: Mar. 15, 1994

[30] Foreign Application Priority Data

Apr. 8, 1993 [CH] Switzerland .................. 1079/93

[51] Int. Cl.$^6$ ................ F02C 3/14; F02C 7/264
[52] U.S. Cl. .................. 60/39.04; 60/39.17
[58] Field of Search ............... 60/39.04, 39.17, 60/39.36, 748, 39.161

[56] References Cited

U.S. PATENT DOCUMENTS

| 2,468,461 | 4/1949 | Price . | |
| 2,821,066 | 1/1958 | Clarke et al. | 60/39.36 |
| 4,206,593 | 6/1980 | Su et al. | 60/39.17 |
| 5,184,460 | 2/1993 | Franciscus et al. | 60/39.17 |

FOREIGN PATENT DOCUMENTS

| 998382 | 1/1952 | France | 60/39.17 |
| 2702440 | 7/1978 | Germany . | |
| 3447717 | 7/1985 | Germany . | |
| 211540 | 12/1940 | Switzerland . | |
| 273506 | 6/1951 | Switzerland . | |

*Primary Examiner*—Louis J. Casaregola
*Attorney, Agent, or Firm*—Burns, Doane, Swecker & Mathis

[57] ABSTRACT

In a gas turbine group which consists essentially of a compressor (2), a first combustion chamber (3), a first turbine (4), a second combustion chamber (5) and a second turbine (6), the first combustion chamber (3) is configured as an annular combustion chamber. This annular combustion chamber (3) is operated by a number of premixing burners (11) which are distributed at the periphery. The first turbine (4) is designed in such a way that its exhaust gases have a temperature level which is above the self-ignition temperature of the fuel (13) used in the second combustion chamber (5). This second combustion chamber (5) consists of a burnerless, annular combustion space in which a number of vortex-generating elements (14) are integrated. The turbomachines, namely compressor (2), first turbine (4) and second turbine (6) are disposed on a rotor shaft (1), this rotor shaft (1) being supported in two bearings (9, 15).

5 Claims, 1 Drawing Sheet

METHOD OF OPERATING GAS TURBINE GROUP WITH REHEAT COMBUSTOR

BACKGROUND OF THE INVENTION

1. Field of the Invention

The present invention relates to a gas turbine group. It also relates to a method for operating a gas turbine group.

2. Discussion of Background

A gas turbine group, which consists essentially of a compressor group, of a first combustion chamber located downstream of the compressor group and upstream of a first turbine and of a second combustion chamber acting downstream of the first turbine and upstream of a second turbine, is disclosed, for example, by German Offenlegungsschrift 27 02 440. In this gas turbine group and in the installations of similar arrangement which have previously become known, the combustion chambers are respectively configured as upright combustion chambers. The connections between a combustion chamber and the turbomachines located upstream and downstream are made by conduits, as is shown and described in the publication quoted, in some cases using inlet and outlet ducts which are difficult to design from aerodynamic and thermal aspects. Apart from the fact that the upright combustion chambers quoted, which generally rise at right angles to the rotor shaft, affect the size of the buildings, the axial space requirement for the inlet and outlet ducts necessarily involves a lengthening of the rotor shaft in such a way that, from static and dynamic considerations, the turbomachines then have to be supported in at least three bearings, the rotor shaft is subdivided between the individual turbomachines by couplings or the turbomachines are effectively connected to one another in a multi-shaft arrangement. Particularly in the case of jet engine gas turbine groups, as is apparent for example from German Offenlegungsschrift 34 47 717, the transition has been made by configuring the single combustion chamber between the compressor and the turbine as a so-called annular combustion chamber, which intrinsically permits a more compact external envelope of the complete turbine group. Where this technique is transferred to power station installations, however, the same problems, mentioned above, arise with respect to static and dynamic imponderables.

SUMMARY OF THE INVENTION

Accordingly, in order to provide aid in this respect, one object of the invention, as claimed in the claims, is to provide a novel configuration in a gas turbine group of the type mentioned at the beginning. In this gas turbine group, all the rotating units of the turbomachines are constituent parts of a single rotor shaft and the combustion chambers are disposed around said rotor shaft with their axial and radial extent minimized.

The essential advantages of the invention are to be seen in the fact that a substantially higher specific power and a higher efficiency can be achieved by means of the invention.

A further essential advantage of the invention is to be seen in the fact that the efficiency is higher in part-load operation of the installation.

A further essential advantage of the invention is related to the spatial extent of the machine, which impresses by its compactness.

In addition, the invention has the advantage that it is possible to open up a further development potential for gas turbines and combined installations (gas turbine and steam turbine installations) due to increased outlet temperatures.

Advantageous and expedient further developments of the solution to the task in accordance with the invention are claimed in the further subclaims.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein.

DESCRIPTION OF THE PREFERRED EMBODIMENTS

Figure 1:
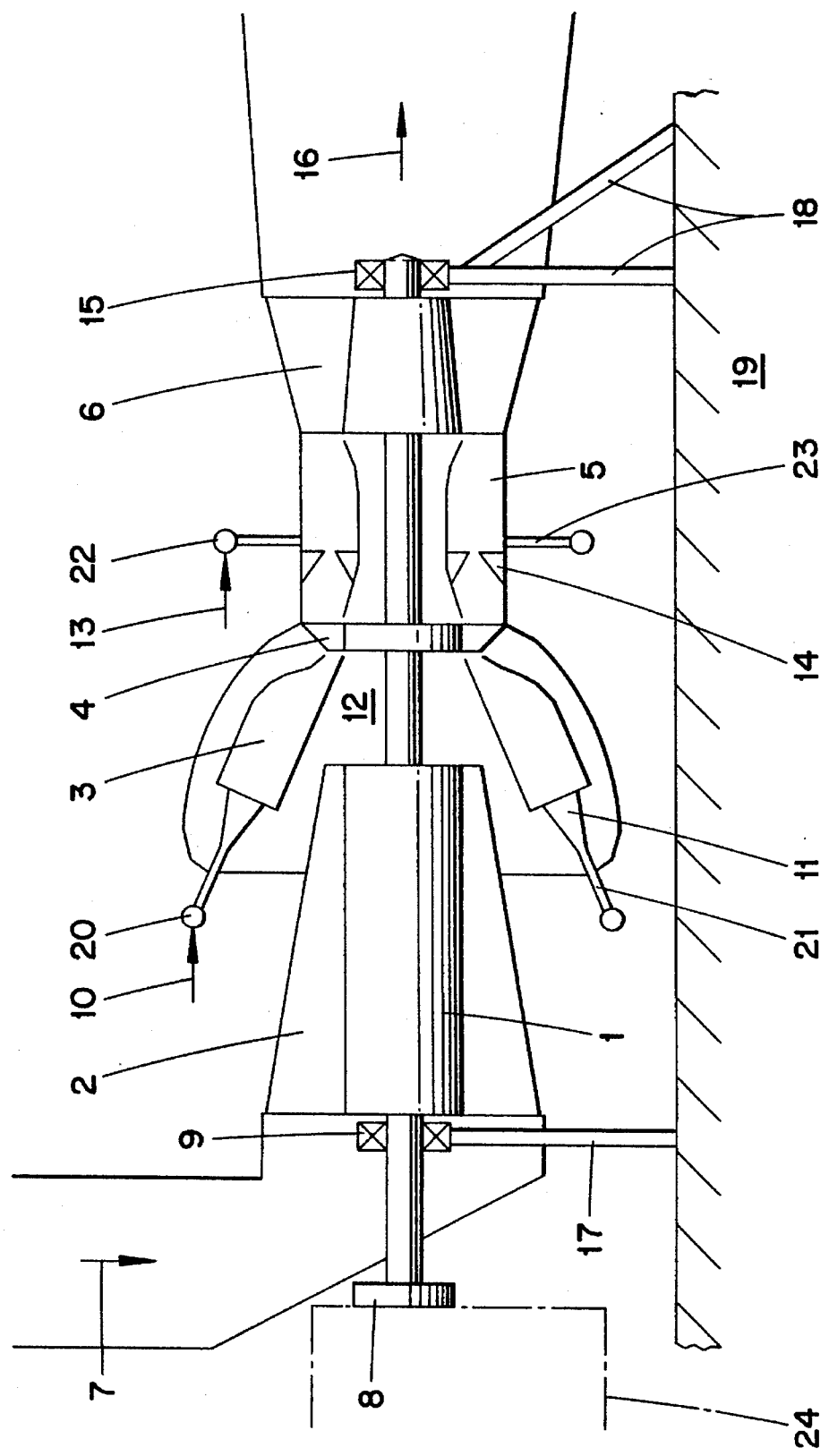
FIG. 1 shows a cross section through gas turbine group.

Referring now to the drawing, wherein all the elements not necessary for immediate understanding of the invention are omitted and the flow direction of the media is indicated by arrows, FIG. 1 shows a gas turbine group. The preparation (not shown) of the fuel necessary for operating the various combustion chambers or heat generators can, for example, be effected by a coal gasification system which interacts with the gas turbine group. It is, of course, also possible to take the fuel used from a primary network. If the supply of a gaseous fuel for operating the gas turbine group is effected by means of a pipeline, the potential from the pressure difference and/or temperature difference between the primary network and the consumption unit network can be recuperated for the requirements of the gas turbine group or generally of the circuit. The present gas turbine group can be readily extended to provide a so-called combined installation by means of a downstream steam cycle (not shown).

The gas turbine group consists, as an autonomous unit, of a compressor 2, a first combustion chamber 3 connected downstream of the compressor, a first turbine 4 connected downstream of this combustion chamber 3, a second combustion chamber 5 connected downstream of this turbine 4 and a second turbine 6 connected downstream of this combustion chamber 5. The turbomachines 2, 4 and 6 mentioned have a single rotor shaft 1. This rotor shaft 1 is itself supported in two bearings 9, 15 which are placed at the front end of the compressor 2 and downstream of the second turbine 6. The bearings 9, 15 are mounted on anchor units 17, 18 bonded into the foundation 19.

Depending on the operational layout, the compressor stage can be subdivided into two partial compressors (not shown) in order, for example, to increase the specific power. In such an arrangement, an intercooler, in which the partially compressed air is intercooled, is then connected downstream of the first compressor and upstream of the second compressor. The heat arising from the previously mentioned intercooling in this intercooler (likewise not shown) is optimally, i.e. usefully, returned to the process of the respective power station installation.

After compression, the induced air 7 flows into a casing 12 which encloses the compressor outlet and the first turbine 4. The first combustion chamber 3, which is configured as a self-contained annular combustion chamber, is accommodated in the casing 12. The compressed air to the first combustion chamber 3 can, of course, be provided from an air reservoir installation (not shown). At its front end, the annular combustion chamber 3 has a number of burners 11 distributed on the periphery and these maintain the generation of hot gas.

Diffusion burners can intrinsically be used here. For the purpose of reducing the pollutant emissions from this combustion, particularly the $NO_x$ emissions, it is advantageous to provide an arrangement of premixing burners as described in U.S. Pat. No. 4,932,861 to Keller et al., the subject matter of the invention from the publication quoted being an integrating constituent part of this description. It is also advantageous to provide the type of fuel supply described there, which is symbolized in the present figure by means of the fuel lances 21 connected together by a ring main 20.

With respect to the arrangement of the premixing burners in the peripheral direction of the annular combustion chamber 3, such an annular combustion chamber can, if required, deviate from the usual configuration of similar burners and can, instead, use premixing burners of different sizes. This advantageously occurs in such a way that a small premixing burner of the same configuration is disposed between each two large premixing burners. The large premixing burners, which have to fulfill the function of main burners, have a size relationship (in terms of the burner air flowing through them—i.e. the compressed air from the compressor 2) relative to the small premixing burners (which are the pilot burners of this combustion chamber) which is determined from case to case.

The pilot burners operate as self-acting premixing burners over the complete load range of the combustion chamber, the equivalence ratio remaining almost constant. The main burners are switched on or off in accordance with certain requirements specific to the installation. Because the pilot burners can be operated with an ideal mixture over the whole of the load range, the $NO_x$ emissions are very small even at part load.

In such an arrangement, the circulating streamlines in the front region of the annular combustion chamber 3 come very close to the vortex centers of the pilot burners so that combustion is intrinsically only possible by means of these pilot burners. When running up, the fuel quantity which is supplied via the pilot burners is increased until the pilot burners are fully activated, i.e. until the full fuel quantity is available. The configuration is selected in such a way that this point corresponds to the particular load rejection conditions of the gas turbine group.

The further increase in power then takes place by means of the main burners. At peak load of the gas turbine group, the main burners are therefore also fully activated. Because the configuration of "small" hot vortex centers initiated by the pilot burners between the "large" cooler vortex centers originating from the main burners is extremely unstable, very good burn-out, with low CO and UHC emissions as well as $NO_x$ emissions, is achieved even when the main burners are operated weak in the part-load range, i.e. the hot vortices of the pilot burners penetrate immediately into the cooler vortices of the main burners. The annular combustion chamber 3 can, of course, consist of a number of individual tubular combustion spaces which are likewise arranged in the form of oblique rings, in some cases also helically, around the rotor axis.

This annular combustion chamber 3, independent of its design, is and can be geometrically so arranged that it has practically no influence on the length of the rotor. The advantages resulting from such a disposition, which is shown very well in the figure, are considered in more detail further below.

The hot gases from this annular combustion chamber 3 act on the first turbine 4 immediately downstream, whose thermally expanding effect on the hot gases is deliberately kept to a minimum, i.e this turbine 4 will consequently consist of not more than two rows of rotor blades. In such a turbine 4, it will be necessary to provide pressure balance at the end surfaces for the purpose of stabilizing the axial thrust.

The hot gases which are partially expanded in turbine 4 and which flow directly into the second combustion chamber 5 have, for the reasons presented, a very high temperature and the layout is preferably specific to the operation in such a way that the temperature will still be reliably around 1000° C.

This second combustion chamber 5 has, essentially, the form of a self-contained annular axial or quasi-axial cylinder. This combustion chamber 5 can, of course, also consist of a number of axial, quasi-axial or helically arranged and intrinsically closed combustion spaces. As far as the configuration of the annular combustion chamber 5 consisting of a single combustion space is concerned, a plurality of fuel lances 23 are disposed in the peripheral direction of this annular cylinder and these are connected together by means of a ring main 22.

This combustion chamber 5 has no burners; the combustion of the fuel 13 blown into the exhaust gases coming from the turbine 4 takes place here by means of self-ignition—provided, of course, the temperature level permits such a type of operation. Assuming that the combustion chamber 5 is operated with a gaseous fuel, i.e. natural gas for example, the temperature of the exhaust gases from the turbine 4 must be around 1000° C. for self-ignition. In order to ensure self-ignition of a natural gas in the combustion chamber 5, the outlet temperature of the gases from the turbine 4 must consequently still be very high, around 1000° C. as presented above, and this must of course also be so during part-load operation. This plays a basic role in the layout of this turbine 3.

In order to ensure operational reliability and high efficiency in a combustion chamber designed for self-ignition, it is eminently important for the location of the flame front to remain stable. For this purpose, a series of elements 14 is provided in this combustion chamber 5, preferably disposed in the peripheral direction on the inner and outer wall. These elements 14 are preferably placed in the axial direction upstream of the fuel lances 23. The task of these elements 14 is to generate vortices, analogous to those in the premixing burners 11, to induce a reverse flow zone.

Because, due to the axial arrangement and the design length, this combustion chamber 5 is a high velocity combustion chamber whose average velocity is greater than approximately 60 m/s, the vortex-generating elements 14 must be configured so that they conform to the flow. At the inlet flow end, these elements 14 should preferably consist of a tetrahedron shape with surfaces oblique to the inlet flow. The vortex-generating elements 14 can be placed on either the outer surface or the inner surface of the combustion chamber 5 or, as is shown in the figure, they can act at both locations.

On the example represented in the figure, it may further be seen that the oblique surfaces are preferably symmetrically arranged between the externally located and internally located vortex-generating elements 14 in such a way that the flow cross-section of the combustion chamber 5 downstream of this location experiences a vortex-generating widening in the region where the fuel 13 is blown in. The vortex-generating elements 14 can also, of course, be displaced axially relative to one another. The outlet flow surface of the vortex-generating elements 14 has an essentially radial configuration so that a reverse flow zone occurs from this point.

The self-ignition in the combustion chamber 5 must also, however, be ensured in the transient load ranges and in the part-load range of the gas turbine group, i.e. aids must be provided which ensure the self-ignition in the combustion chamber 5 even if there should be a fluctuation of the temperature of the gases in the region where the fuel 13 is blown in. In order to ensure reliable self-ignition of the gaseous fuel 13 blown into the combustion chamber 5, a small quantity of another fuel with a lower ignition temperature is added to the gaseous fuel 13.

Fuel oil, for example, is very suitable as the "auxiliary fuel" in this case. The liquid auxiliary fuel, when sprayed in appropriately, fulfills the task of acting as fuse, so to speak, and permits self-ignition in the combustion chamber 5 even if the exhaust gases from the first turbine 4 should have a temperature below the desired optimum level of 1000° C. This measure of providing fuel oil to ensure self-ignition is, of course, found to be particularly applicable whenever the gas turbine group is operated at reduced load.

Furthermore, this measure contributes decisively to the fact that the combustion chamber 5 can have a minimum axial extent. The short design length of the combustion chamber 5, the effect of the vortex-generating elements 14 in stabilizing the flame, and continually ensuring self-ignition are fundamentally responsible for the fact that the combustion takes place very rapidly and the residence time of the fuel in the region of the hot flame front remains minimal. A resulting, directly measurable effect specific to combustion concerns the $NO_x$ emissions which are minimized in such a way that they no longer form a subject of interest.

Furthermore, this initial position permits the position of the combustion to be clearly defined and this is reflected in optimized cooling of the structures of this combustion chamber 5.

The hot gases prepared in the combustion chamber 5 subsequently act on a downstream second turbine 6. The thermodynamic characteristics of the gas turbine group can be designed in such a way that the exhaust gases 16 from the second turbine 6 still have sufficient thermal potential to operate a steam cycle (not shown) in an optimum manner so that the installation would then be a combined installation.

As already indicated during the description of the annular combustion chamber 3, the latter is geometrically arranged in such a way that it exerts practically no influence on the length of the rotor. Furthermore, it was shown that the second combustion chambers extending between the outlet plane of the first turbine 4 and the inlet plane of the second turbine 6 has a minimum length.

Because, furthermore, the expansion of the hot gases in the first turbine 4 takes place over a few rows of rotor blades, for the reasons presented, a gas turbine group can be produced whose rotor shaft 1 can, because of its minimized length, be supported on only two bearings 9, 15. In consequence, these bearings 9, 15 are placed, on the one hand, upstream of the first turbomachine, i.e. of the compressor 2 in this case, and, on the other, downstream of the last turbomachine, i.e. the second turbine 6 in this case, so that the rotor shaft 1 no longer requires any further support in the region of the remaining units of the gas turbine group.

At the compressor end, the rotor shaft 1 has a coupling 8 which is used for the power output; this is normally a generator 24, which is only indicated in the figure.

In order to increase the efficiency of the gas turbine group, it is advantageous for a small diffuser (not visible in the figure) to be provided before the second combustion chamber 5. This would permit the total pressure loss in the overall system to be reduced. Using the conventional diffuser design diagrams, it can be shown that large recovery rates of the dynamic pressure can be achieved even for a minimum length of the diffuser.

As presented above, the compressor stages can be equipped with intercooling. In order to avoid altering the basic geometric concept of the gas turbine group, as shown in the figure, when intercooling is assumed, it is proposed to provide an intercooler (not visible in the figure) which is placed within the stator casing and in the immediate flow direction of the compressor stages. In the case of this intercooler, the cooling takes place indirectly or directly. In the case of direct intercooling, this should preferably take place by means of a unit whose operation is designed for evaporation of the sprayed-in water. The configuration therefore provides for conventional connecting conduits (to an intercooler placed outside the stator casing and from this intercooler back through the stator casing to the next compressor stage) to be completely obviated.

One possibility for an intercooler designed for evaporation consists in providing the same geometrical form as is specified for the burner 11 already mentioned. With such an application, the possibility exists of providing the introduction of the necessary quantity of water into the internal space of the intercooler not only through the nozzle at the front end but also, should the need arise, of effecting it exclusively by means of the nozzles present along the tangential inlet slots of this burner, which has now been converted into an intercooler. In the case of a division of the compressor stage, for example for the purpose of integrating intercooling, the compressor-end bearing can be arranged between the two partial compressors where static and/or dynamic calculations require this.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A method for operating a gas turbine group having at least one compressor, a first annular combustion chamber downstream of the compressor, a first turbine downstream of the first combustion chamber, a second combustion chamber downstream of the first turbine, and a second turbine downstream of the second combustion chamber, the second combustion chamber extending from an outlet plane of the first turbine to an inlet plane of the second turbine, the second combustion chamber being operable without ignition apparatus, the method comprising the steps of:

operating the first combustion chamber to provide combustion gas to the first turbine having a temperature sufficient so that exhaust gas from the first turbine has a temperature greater than an ignition temperature of a main fuel for the second combustion chamber; and, introducing the main fuel into the second combustion chamber to mix with the exhaust gases of the first turbine for self-ignited combustion.

2. A method for operating a gas turbine group as claimed in claim 1, further comprising directing exhaust gases from the second turbine to a steam generating apparatus of a steam turbine group.

3. A method for operating a gas turbine group as claimed in claim 1, further comprising the step of providing vortex generating elements in the second combustion chamber to generate vortices to induce a reverse flow zone downstream of the vortex-generating elements to improve flame stabilization in the region downstream of the vortex-generating elements.

4. A method for operating a gas turbine group as claimed in claim 1, further comprising introducing an auxiliary fuel in the second combustion chamber with the main fuel, the auxiliary fuel having an ignition temperature lower than the ignition temperature of the main fuel.

5. A method for operating a gas turbine as claimed in claim 4, wherein the main fuel is natural gas and the auxiliary fuel is liquid fuel oil.

* * * * *